United States Patent [19]

Tsukada

[11] Patent Number: 5,264,871
[45] Date of Patent: Nov. 23, 1993

[54] IMAGE FORMING APPARATUS HAVING LIGHT BEAM INTENSITY SWITCHING FOR DETECTION PURPOSES

[75] Inventor: Masaharu Tsukada, Kawasaki, Japan

[73] Assignee: Canon Kabushiki Kaisha, Tokyo, Japan

[21] Appl. No.: 881,252

[22] Filed: May 11, 1992

[30] Foreign Application Priority Data

May 14, 1991 [JP] Japan ................................ 3-137000

[51] Int. Cl.$^5$ ............................................. G01D 9/42
[52] U.S. Cl. ................................... 346/108; 358/298
[58] Field of Search ................. 346/108; 358/296, 298

[56] References Cited

U.S. PATENT DOCUMENTS

| | | | |
|---|---|---|---|
| 4,768,043 | 8/1988 | Saito et al. | 346/108 |
| 4,862,289 | 8/1989 | Shimada | 358/298 |
| 4,872,025 | 10/1989 | Sekiya et al. | 346/108 |
| 5,017,944 | 5/1991 | Kitamura et al. | 346/108 |

Primary Examiner—A. T. Grimley
Assistant Examiner—William J. Royer
Attorney, Agent, or Firm—Fitzpatrick, Cella, Harper & Scinto

[57] ABSTRACT

An image forming apparatus for forming an image by using a scanning light beam includes a light beam generator for generating a light beam and for modulating the light beam in accordance with an image signal, a scanner for scanning a photosensitive member with the light beam, and a beam detector for detecting the light beam scanned by the scanning means at a predetermined position along the scanning path. Setting circuitry switches and sets a pixel density of an image to be formed. The light quantity of the light beam is controlled in accordance with the pixel density set by the setting circuitry, and/or the light beam detection level of the detector is switched in accordance with the pixel density set by the setting circuitry.

14 Claims, 4 Drawing Sheets

IMAGE FORMING APPARATUS HAVING LIGHT BEAM INTENSITY SWITCHING FOR DETECTION PURPOSES

BACKGROUND OF THE INVENTION

1. Field of the Invention

The present invention relates to an image forming apparatus for forming an image by scanning a photosensitive member with a light beam, such as a laser beam printer.

2. Description of the Related Art

FIG. 4 is a perspective view of an example of a beam scanning apparatus.

Referring to FIG. 4, a laser unit 2 conducts ON/OFF modulation of a laser beam in accordance with an image signal (VDO signal) 1. Motor 4 rotates a rotary polygon mirror 5, which deflects laser beam 3 emitted from the laser unit 2, at a constant speed. Imaging lens 6 focuses a laser beam 7 deflected by the polygon mirror 5 onto a photosensitive drum 8. Beam detector 9 detects whether or not the laser beam 7, which has been deflected by the polygon mirror 5, is disposed on the optical path between a light receiving start position A of the rotating photosensitive drum 8 and the polygon mirror 5, and outputs a beam detection signal (BD signal) 11 in response to the detection of the laser beam 7. A photo-electric conversion element, for example, a photodiode, can be used as the beam detector 9. A latent image is formed on the photosensitive drum 8, the latent image is developed by an unshown developing device, and the developed image is transferred to a transfer sheet 12 to form an image.

The laser unit 2 outputs the laser beam 3 in accordance with the VDO signal 1. The ON/OFF modulated laser beam 3 is deflected by the polygon mirror 5, and focused onto the photosensitive drum 8 through the imaging lens 6. Since the polygon mirror 5 is rotated by the motor 4 at a constant speed, the imaging position of the deflected laser beam 7 is shifted in the main scanning direction AA on the photosensitive drum 8 (horizontal scanning).

A latent image is formed on the photosensitive drum 8 serving as a recording medium is exposed with the laser beam 7. As the photosensitive drum 8 is rotated in the direction of the arrow BB, the latent image formed on the photosensitive drum 8 is developed by the unillustrated developing device (not shown), and then the developed image is transferred onto the transfer sheet 12. The beam detector 9 outputs the BD signal 11 when detecting the laser beam 7 previous to the horizontal scanning with the laser beam 7. Based on the BD signal 11, an unillustrated control unit controls the timing of transferring the VDO signal 1 to the laser unit 2. Thereby, the VDO signal 1 for one scanning line is transferred to the laser unit 2 in synchronization with the BD signal 11, and an image is reproduced on the transfer sheet 12 in accordance with the above procedures. The exposure start position in the main scanning direction AA on the photosensitive drum 8 is determined by the BD signal 11.

FIG. 5 is a timing chart explaining the generation timing of the BD signal 11 and the VDO signal 1.

Since the laser beam 3 is emitted at a timing F in response to a VDO signal 1 which is ON to detect the exposure start position, the beam detector 9 outputs a BD signal 11. After a predetermined time has elapsed after the output of the BD signal 11, the VDO signal 1 is turned off, and image data G, which is to be printed, is output as VDO signal 1 after a period of "a" of a time T1 has elapsed after the output of BD signal 11. Furthermore, a VDO signal 1 is output after a time T1+T2 has passed from the output of the BD signal 11. The above operation is repeated for every line, thereby printing images for one page.

The user can switch the print density as necessity requires in some of laser beam printers having the above construction. The switching of the print density is generally carried out by the following method.

For example, in a laser beam printer, if the print density is increased, the pixel density in the vertical direction of an image is heightened by increasing the number of rotations of the motor 4 for rotating the polygon mirror 5, by increasing the horizontal scanning density of the laser beam 7. Furthermore the pixel density in the horizontal direction is heightened by increasing the clock frequency of the VDO signal 1 for modulating the laser.

In a case that the diameter of the laser beam on the photosensitive drum 8 is constant even if the pixel density is switched, it has a detrimental effect on image quality (for example, a printed character is deformed) at some pixel densities. Therefore, the laser power may be reduced so as to make the diameter of the laser beam on the photosensitive drum 8 equivalently small in printing at high pixel density.

However, when the laser power is decreased, the quantity of light reaching the beam detector 9 is reduced and a sufficient beam position detection signal cannot be obtained. Therefore, the range in which the pixel density can be changed is extremely limited, or when the pixel density is too high, the BD signal 11 serving as an output signal of the beam detector 9 may be missed and thus a proper image cannot be printed.

SUMMARY OF THE INVENTION

The present invention provides an image forming apparatus capable of precisely outputting an image write start timing signal in the main scanning direction even if the power of a light beam is changed in correlation with switching of the pixel density.

According to one aspect of the present invention, an image forming apparatus includes detection means for outputting a detection signal in accordance with a presence of a scanning light beam at a predetermined position along a scanning path, selecting means for selecting one of a plurality of pixel densities, and recording means for recording an image at the selected pixel density by using scanning light beam. Switching means are provided for switching a scanning light beam intensity at a timing for recording an image and for switching a scanning light beam intensity at a timing for detecting by the detection means in a case that the selected pixel density is at least one predetermined pixel density.

According to another aspect of the present invention, an image forming apparatus comprises beam detecting means for outputting a detection signal in accordance with a presence of a scanning light beam, synchronizing signal generating means for generating a synchronizing signal to determine an image write timing in a scanning direction based on an output of said beam detecting means, and pixel density selecting means for selecting a plurality of pixel densities to form an image by using the scanning light beam. Gain switching means are provided for switching an output gain of the beam detecting means based on the pixel density selected by the pixel density selecting means.

According to another aspect of the present invention, an image forming apparatus comprises light beam generating means for generating a light beam and for modulating the light beam in accordance with the image signal, and scanning means for scanning a photosensitive member with the light beam generating means. Detecting means are provided for detecting the light beam scanned by the scanning means at a predetermined position along the scanning path, and setting means are provided for switching and setting a pixel density of an image to be formed. Light quantity control means controls the light beam generating means in accordance with the pixel density set by the setting means so as to generate a light beam having a specific light quantity, and level switching means switches a light beam detection level of the detection means in accordance with the pixel density set by the setting means.

Objectives and advantages in addition to those discussed above shall be apparent to those skilled in the art from the description of the preferred embodiment of the invention which follows. In the description, reference is made to the accompanying drawings, which form a part hereof, and which illustrate an example of the invention. Such example, however, is not exhaustive of the various embodiments of the invention, and therefore reference is made to the appended claims for determining the scope of the invention.

DESCRIPTION OF THE PREFERRED EMBODIMENTS

Preferred embodiments of the present invention will now be described with reference to the accompanying drawings.

Figure 1:
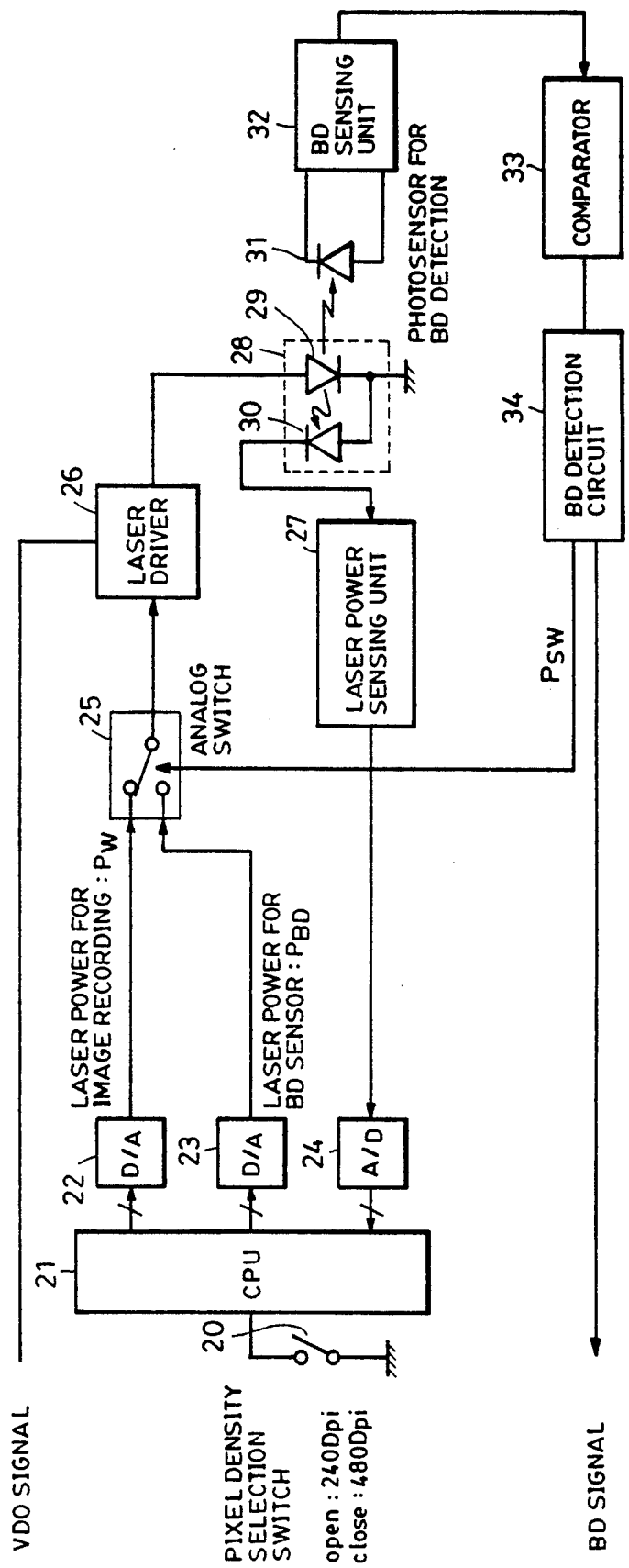
FIG. 1 is a block diagram explaining the construction of the principal part of an image forming apparatus according to an embodiment of the present invention.

FIG. 1 is a block diagram showing the construction of the principal part of an image forming apparatus according to an embodiment of the present invention.

Referring to FIG. 1, one of two pixel densities 240DPI and 480DPI (dot per inch) can be selected according to the state of a pixel density selection switch 20. That is, by opening or closing the pixel density selection switch 20 a pixel density of 240 DPI or 480 DPI can be selected. A CPU 21 controls the print sequence of a laser beam printer over all, and a laser power control portion is specifically illustrated in FIG. 1. Each D/A converter 22 and 23 outputs an analog signal for controlling a drive current to be applied to a laser driver 26 according to data from the CPU 21.

An A/D converter 24 converts a laser power sensing output (analog signal) from a laser power sensing unit 27 into a digital signal. An analog switch 25 selects an output of either D/A converter 22 or 23. The laser driver 26 determines a current value for driving a laser unit 28 in accordance with an output voltage from the analog switch 25, and turns a semiconductor laser 29 on or off in response to an input VDO signal. A photodiode 30 for monitoring the laser power is built into a package of the laser unit 28. The laser power sensing unit 27 converts a sensing signal of the photodiode 30 from current to voltage, and outputs a voltage proportional to the laser power to the A/D converter 24 in the following stage. A photosensor 31 detects a BD signal 11, and a BD sensing unit 32 converts a sensor signal of the photosensor 31 from current to voltage and outputs a sensing voltage to a comparator 33 on the next stage. A BD detection circuit 34 always monitors the cycle of the BD signal 11, prevents an incorrect output of the BD signal 11, and outputs a switch signal PSW for the analog switch 25 to switch the laser power at a timing described below. In this embodiment, it is assumed that well-known digital APC (Auto Power Control) disclosed in, for example, U.S. Pat. No. 4,890,288 is carried out by the CPU 21 in order to set the laser power at a predetermined value.

In the image forming apparatus having the foregoing structure, a digital value output from CPU 21 to D/A converter 22 increases when a digital value input from A/D converter 24 attains a predetermined value or decreases when the digital value does not attain the predetermined value. At this time, respective different predetermined values, corresponding to a plurality of pixel density switched by a pixel density selection switch 20, are set. Therefore, a laser power for recording an image is set in accordance with the pixel density.

Furthermore, a digital value output from CPU 21 to D/A converter 23 also increases when a digital value input from A/D converter 24 attains a predetermined value or decreases when the digital value does not attain the predetermined value.

However, the predetermined value of a laser power for BD sensor is fixed even if the laser power for recording the image is changed in accordance with the pixel density, so the scanning laser beam can be detected without an error.

When a setting means switches the pixel density of an image to be formed by changing at least the modulation speed of the light beam based on an image signal, a light quantity control means (well-known digital APC or the like) controls the quantity of a light beam generated by a light beam generating means (the semiconductor laser 29) in accordance with the set pixel density, a level switching means switches the light beam detection level of the detection means (the photosensor 31 for BD detection) in accordance with the pixel density set by the setting means (for example, by switching a reference potential set by the comparator 33), and the detection means certainly detects a predetermined position of the light beam to be scanned and outputs a timing of writing in the main scanning direction.

Figure 2:
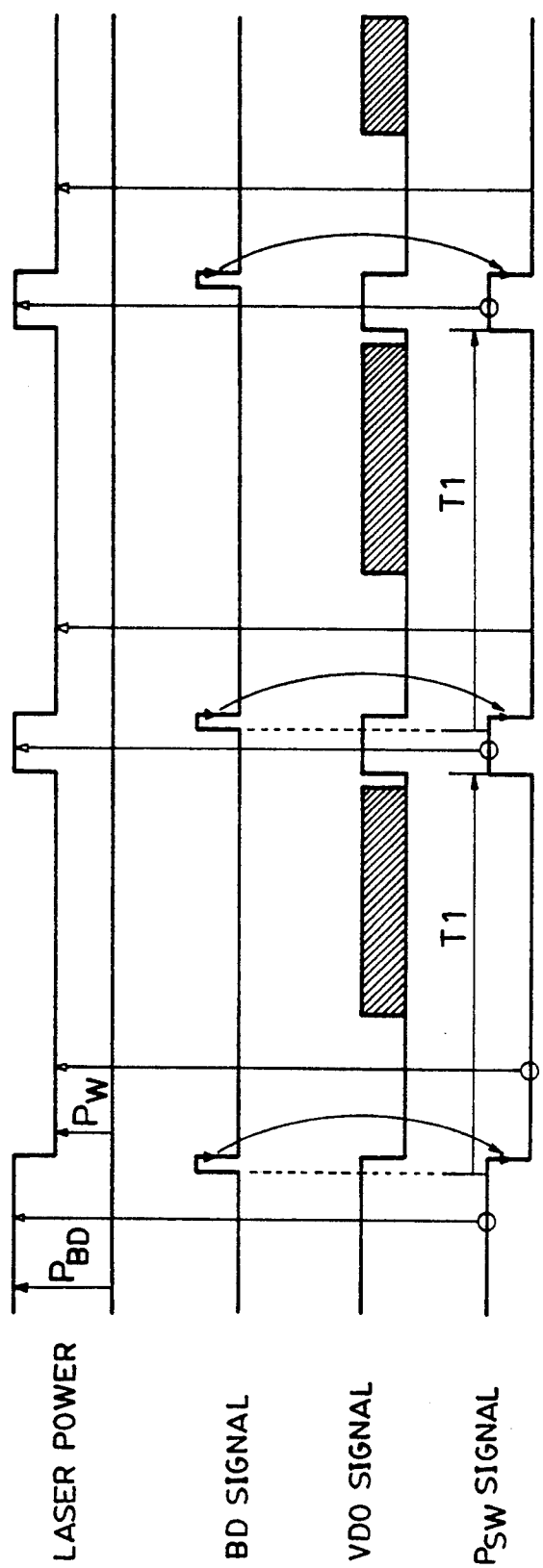
FIG. 2 is a timing chart explaining the output timing of a switch signal PSW output from a BD detection circuit shown in FIG. 1.

FIG. 2 is a timing chart explaining the output timing of switch signal PSW output from the BD detection circuit 34 shown in FIG. 1.

First, the CPU 21 outputs a digital value to the D/A converter 22, and transmits an analog value corresponding to the digital value to the laser driver 26. The laser driver 26 drives the semiconductor laser 29 with a current corresponding to the input analog value, and the photosensor 31 detects the power of an emitted light beam. The detected laser power is converted from current to a corresponding voltage by the laser power sensing unit 27, and converted into a digital value by the A/D converter 24 on the next stage. The CPU 21 determines whether or not the actual output laser power is higher than a desired laser power based on the digital value output from the A/D converter 24, and if the actual laser power is higher/lower than the desired set power, outputs a value smaller/larger than the digital value, which was output to the D/A converter 22 previously, thereby decreasing/increasing the laser power. The laser power is controlled by repeating the foregoing operation so that the actual laser power approaches and conforms to the set laser power.

The pixel density switching process (DPI switching process) will now be described.

In the DPI switching of this embodiment, either pixel density of 240DPI or 480DPI can be selected by the pixel density selection switch 20. When the pixel density is switched from 240DPI to 480DPI, the revolution speed of the polygon mirror 5 is increased to the double of that in the case of 240DPI. The clock frequency of the VDO signal 1 simultaneously becomes four times as high as that of 240DPI. Since it is necessary to reduce the laser beam diameter by half, the laser beam diameter is equivalently reduced by decreasing the laser power. A printing operation of 480DPI is achieved by the above process. Since the laser power of 480DPI is approximately 70% of that of 240DPI, it is likely that the BD detection circuit 34 will not be able to detect the BD signal 11.

Accordingly, the D/A converter 23 is additionally mounted in this embodiment in order to set a laser power for BD sensing. Furthermore, the BD detection circuit 34 outputs switch signal PSW representing a non-image area. The D/A converter 23 can set an appropriate analog value according to data from the CPU 21, and sets a voltage for outputting a power level PBD as shown in FIG. 2. The laser power of the power level PBD is a power level on which the BD signal 11 can be certainly detected. In the following stage the D/A converter 23 is connected to the analog switch 25.

On the other hand, the switch signal PSW is input to the analog switch 25 as a control signal for switching. In other words, when the semiconductor laser 29 reaches a non-image area according to the switch signal PSW representing the non-image area, the contact of the analog switch 25 serves as a circuit for linking the output of the D/A converter 23 to the laser driver 26, and the semiconductor laser 29 is forcibly driven on the power level PBD (at this time, since an unblanking signal is laid on the VDO signal 1, the semiconductor laser 29 is driven). Since the semiconductor laser 29 is on the power level PBD where the BD signal 11 can be sufficiently detected at the detection timing of the BD signal 11, even if the laser power is changed by the DPI switching, the BD signal 11 can be detected without fail. Furthermore, when the BD signal 11 is detected, the switch signal PSW is turned off in response to the detection, and the contact of the analog switch 25 serves as a circuit for linking the output of the D/A converter 22 to the laser driver 26. In a subsequent image recording operation, the semiconductor laser 29 is ON/OFF driven on the power level in accordance with the recording density, and a proper latent image is formed on the photosensitive drum 8.

Figure 3:
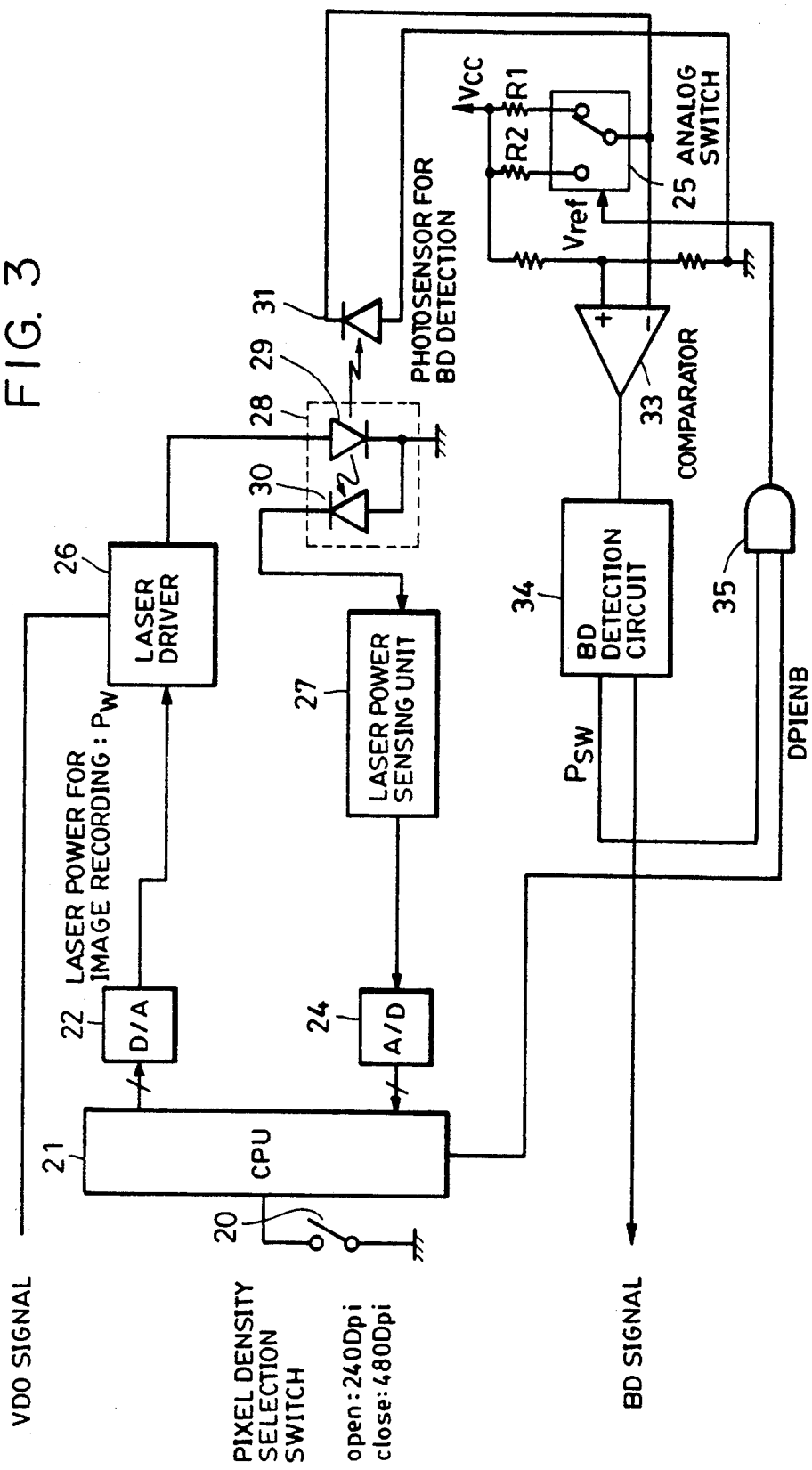
FIG. 3 is a block diagram explaining the construction of the principal part of an image forming apparatus according to another embodiment of the present invention.
Figure 4:
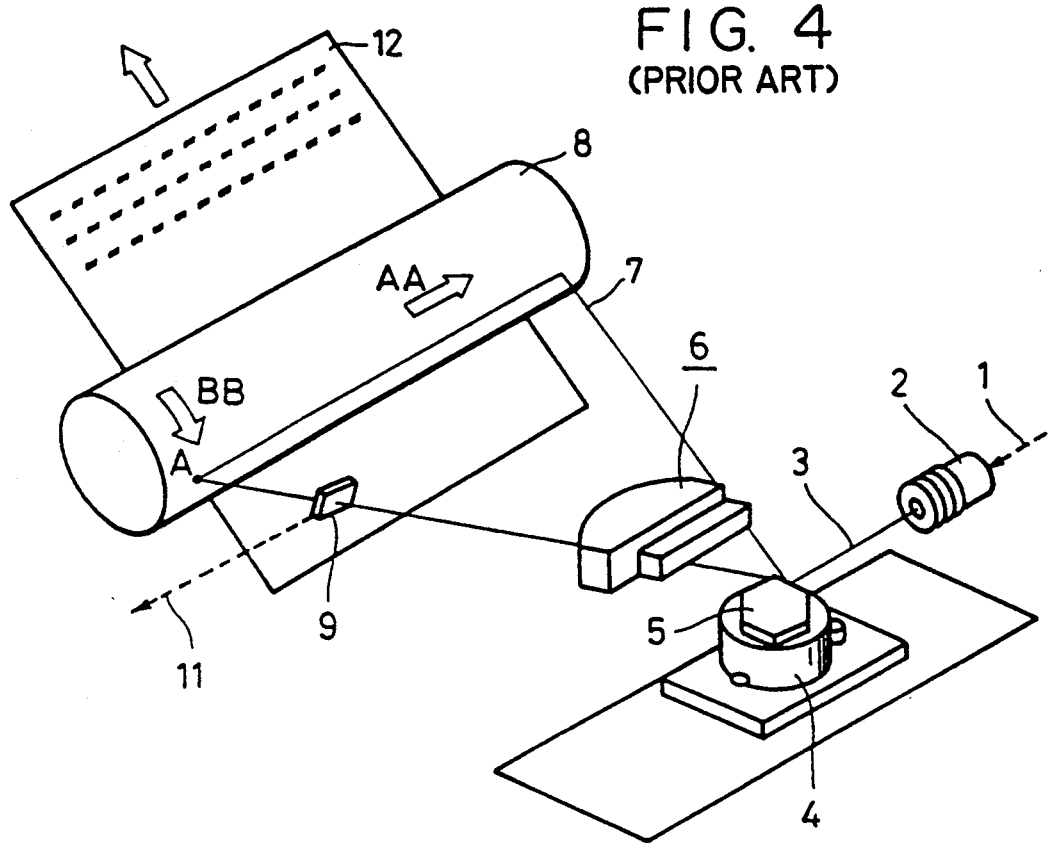
FIG. 4 is a perspective view of a beam scanning apparatus.
Figure 5:
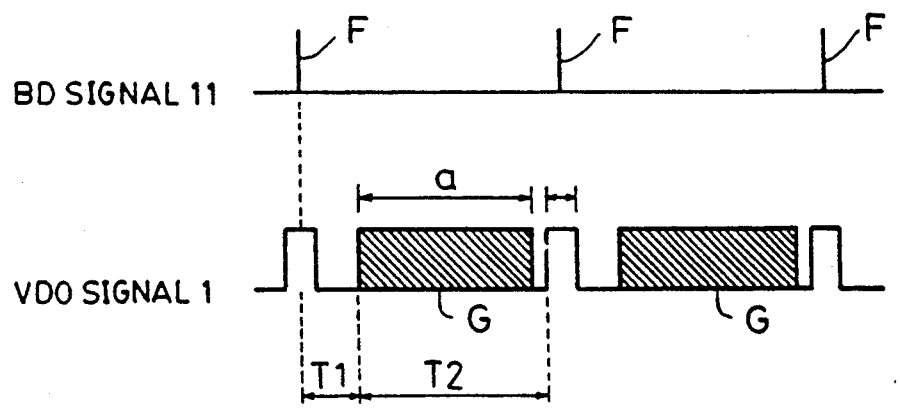
FIG. 5 is a timing chart explaining the generation timing of a BD signal and a VDO signal.

FIG. 3 is a block diagram explaining the construction of the principal part of an image forming apparatus according to another embodiment of the present invention. The same components as those in shown in FIG. 1 are denoted by like numerals. The construction and operation of the image forming apparatus will now be explained.

As shown in FIG. 3, the D/A converter 23 and the analog switch 25 shown in FIG. 1 are omitted, and a comparator 33, an analog switch 25 and a gate 35 are instead added next to a photosensor 31 for BD detection In this construction, resistors R1 and R2 determine the sensitivity of the BD detection photosensor 31 and are switched by the analog switch 25 in accordance with the output timing of a switch signal PSW which serves as an output signal from the BD detection circuit 34.

The timing of the switch signal PSW is the same as shown in the timing chart of FIG. 2. In the image forming apparatus having the above construction, since gate 35 is not essential for the present invention, it is also possible to switch analog switch 25 by only switch enable signal DPIENB. Even if the power of the scanning light beam changes in accordance with pixel density, an output gain of a detection signal can be switched in accordance with change of the power so that errors caused by a difference of the pixel density can be prevented and a BD signal having high accuracy can be obtained.

The switching of resolution between 240DPI to 480DPI will now be described.

When the resolution of the printer engine is 240DPI, the switch enable signal DPIENB from CPU 21 to a gate 35 is on the L level. In other words, the analog switch 25 is connected to the resistor R1 as shown in FIG. 3. When DPI is switched to 480DPI, the switch enable signal DPIENB is turned to the H level, and gate 35 is opened. In this state, when a switch signal PSW representing a non-image area is generated, since the gate 35 is open, the gate output is transmitted to the analog switch 25 and the contact is switched to the resistor R2. A resistance value of the resistor R2 is set higher than that of the resistor R1, and the resistance is set so that the voltage drop of the resistor R2, due to the output current from the photosensor 31, is substantially equal to that of the resistor R1 at the time of 240DPI even if the laser power is reduced to 70% by the switching to 480DPI. In other words, since a comparator voltage as an input of the comparator 33 is always constant even if the laser power is changed by the DPI switching, the BD signal 11 can be detected.

As described above, according to the present invention, the signal generating means can precisely generate an image write timing signal in the main scanning direction even if the power of the light beam is changed by the switching of the pixel density.

Furthermore, in the case the power of the light beam is changed in correlation to the switching of the pixel density, the detection means shifts the detection level of the light beam thereby providing a write timing which can be precisely generated from the scanned light beam.

Therefore, it is possible to generate a writing timing in the main scanning direction even in the case where the power of the light beam is changed by the switching of the pixel density.

Combinations of the above embodiments are possible.

The present invention is not limited to the above embodiments, and various changes can be made without departing from the scope of the present invention as set in the accompanying claims.

What is claimed is:

1. An image forming apparatus comprising:

detection means for outputting a detection signal in accordance with a presence of a scanning light beam at a predetermined position along a scanning path;

selecting means for selecting one of a plurality of pixel densities;

recording means for recording an image at the selected pixel density by using the scanning light beam; and switching means for switching a scanning light beam intensity at a timing for recording an image and for switching a scanning light beam intensity at a timing for detecting by the detection means, wherein selected pixel density is a predetermined pixel density, the scanning light intensity at a timing for recording an image is different from the scanning light beam intensity at a timing for detecting.

2. An image forming apparatus according to claim 1, further comprising:

image signal generating means for generating an image signal in accordance with a detection signal from the detection means; and modulation means for modulating said scanning light beam in accordance with the image signal, wherein said image signal generating means changes an output speed of the image signal in accordance with the pixel density selected by said selecting means.

3. An image forming apparatus according to claim 1, wherein a scanning speed of said scanning light beam is switched in accordance with the pixel density selected by said selecting means.

4. An image forming apparatus according to claim 1, wherein said image forming apparatus forms an image on a recording medium by using electrophotography.

5. An image forming apparatus, comprising:

beam detecting means for outputting a detection signal in accordance with a presence of a scanning light beam;

synchronizing signal generating means for generating a synchronizing signal to determine an image write timing in a scanning direction based on an output of said beam detecting means;

pixel density selecting means for selecting one of a plurality of pixel densities to form an image by using said scanning light beam; and gain switching means for switching an output gain of said beam detecting means based on the pixel density selected by said pixel density selecting means.

6. An image forming apparatus according to claim 5, further comprising:

image signal generating means for generating an image signal in synchronization with the synchronizing signal; and modulation means for modulating said scanning light beam in accordance with the image signal, wherein said image signal generating means changes an output speed of the image signal in accordance with the pixel density selected by said pixel density selecting means.

7. An image forming apparatus according to claim 5, wherein a scanning speed of said scanning light beam is switched in accordance with the pixel density selected by said pixel density selecting means.

8. An image forming apparatus according to claim 5, wherein said image forming apparatus forms an image on a recording medium by using electrophotography.

9. An image forming apparatus, comprising:

light beam generating means for generating a light beam and for modulating said light beam in accordance with an image signal;

scanning means for scanning a photosensitive member with said light beam generated from said light beam generating means;

detection means for detecting said light beam scanned by said scanning means at a predetermined position along a scanning path;

setting means for switching and setting a pixel density of an image to be formed;

light quantity control means for controlling said light beam generating means in accordance with the pixel density set by said setting means so as to generate a light beam having a specific light quantity; and level switching means for switching a light beam detection level of said detection means in accordance with the pixel density set by said setting means.

10. An image forming apparatus according to claim 9, further comprising:

image signal output means for outputting an image signal in synchronization with an output of said detection means, wherein said image signal output means changes an output speed of the image signal in accordance with the pixel density set by said setting means.

11. An image forming apparatus according to claim 9, wherein said scanning means changes a scanning speed of said light beam in accordance with the pixel density set by said setting means.

12. An image forming apparatus according to claim 9, wherein said image forming apparatus forms an image on a recording medium by using electrophotography.

13. An image forming apparatus comprising:

light beam generating means for generating a light beam modulated by an image signal at a light beam intensity selected from a plurality of light beam intensities;

deflecting means for deflecting the light beam generated by said light beam generating means;

detection means for detecting the deflected light beam at a predetermined position outside an image area; and setting means for setting a light beam intensity at a timing for detecting by said detection means, wherein, in a case said selected light beam intensity is a predetermined light beam intensity, said setting means sets the light beam intensity different from said selected light beam intensity at a timing for detecting by said detection means.

14. An image forming apparatus according to claim 13, wherein said image forming apparatus can form an image at one of a plurality of pixel densities, and wherein a light beam intensity is selected in accordance with the pixel density.

* * * * *